US012353664B1

(12) United States Patent
Shverdin et al.

(10) Patent No.: US 12,353,664 B1
(45) Date of Patent: Jul. 8, 2025

(54) REGISTERING SELECTIONS OF GRAPHICAL ELEMENTS ON ELECTRONIC DISPLAYS USING TIME-OF-FLIGHT SENSORS

(71) Applicant: Amazon Technologies, Inc., Seattle, WA (US)

(72) Inventors: Miro Yakov Shverdin, Mountain View, CA (US); Omer Itzchak Wagner, Cambridge (GB); Mark Adcock, Cambridge (GB); Evangelos Pappas-Katsiafas, Cambridge (GB); Vlastimil Pis, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/955,020

(22) Filed: Sep. 28, 2022

(51) Int. Cl.
G06F 3/042 (2006.01)
G01S 7/481 (2006.01)
G01S 17/89 (2020.01)
G06F 3/04842 (2022.01)

(52) U.S. Cl.
CPC .......... *G06F 3/0428* (2013.01); *G01S 7/4814* (2013.01); *G01S 7/4816* (2013.01); *G01S 17/89* (2013.01); *G06F 3/0421* (2013.01); *G06F 3/04842* (2013.01)

(58) Field of Classification Search
CPC .. G06F 3/0428; G06F 3/0421; G06F 3/04842; G01S 7/4814; G01S 7/4816; G01S 17/89
See application file for complete search history.

(56) References Cited

U.S. PATENT DOCUMENTS

| 4,507,557 | A  | * | 3/1985  | Tsikos ................... G06F 3/0421 250/221 |
| 6,498,602 | B1 | * | 12/2002 | Ogawa ................ G06F 3/03545 345/173 |
| 6,597,348 | B1 | * | 7/2003  | Yamazaki ............. G06F 3/0488 178/18.09 |
| 8,723,789 | B1 | * | 5/2014  | Rafii ....................... G06F 3/017 345/158 |
| 8,854,433 | B1 | * | 10/2014 | Rafii ....................... G06F 3/011 348/42 |
| 9,052,780 | B2 | * | 6/2015  | Lu .......................... G06F 3/0428 |
| 9,110,541 | B1 | * | 8/2015  | Zhou ....................... G06F 3/017 |
| 9,207,773 | B1 | * | 12/2015 | Rafii .................... G06V 20/653 |
| 9,268,407 | B1 | * | 2/2016  | Noble .................... G06F 3/005 |
| 9,507,429 | B1 | * | 11/2016 | Grauer, Jr. ............. G06F 3/017 |
| 9,507,462 | B2 | * | 11/2016 | Zhu ........................ G06F 3/042 |

(Continued)

*Primary Examiner* — Benyam Ketema
(74) *Attorney, Agent, or Firm* — Kilpatrick Townsend & Stockton LLP

(57) ABSTRACT

Described herein is a computer-implemented method for registering selections of graphical elements on electronic displays using time-of-flight sensors. First sensor data that is output by a first time-of-flight sensor can be received by a computing device. The first time-of-flight sensor can be positioned in a first orientation with respect to an electronic display. A position of an object on a surface of the electronic display can be determined based at least in part on the first sensor data. A user selection of a graphical element displayed on the electronic display can be registered at the determined position.

19 Claims, 15 Drawing Sheets

(56) References Cited

U.S. PATENT DOCUMENTS

| | | | | |
|---|---|---|---|---|
| 2010/0295821 A1* | 11/2010 | Chang | .................. | G06F 3/0421 |
| | | | | 345/175 |
| 2011/0267265 A1* | 11/2011 | Stinson | .................. | G06F 3/017 |
| | | | | 345/157 |
| 2013/0222246 A1* | 8/2013 | Booms | ................. | G06F 3/0346 |
| | | | | 345/156 |
| 2013/0335334 A1* | 12/2013 | Zhu | ........................ | G06F 3/042 |
| | | | | 345/173 |
| 2014/0017438 A1* | 1/2014 | Boettinger | ............... | B32B 3/14 |
| | | | | 428/77 |
| 2014/0043230 A1* | 2/2014 | Galor | ................. | G06F 3/04815 |
| | | | | 345/156 |
| 2015/0054820 A1* | 2/2015 | Ji | ........................... | G06F 3/038 |
| | | | | 345/418 |
| 2015/0062004 A1* | 3/2015 | Rafii | ...................... | G06F 3/011 |
| | | | | 345/156 |
| 2016/0252968 A1* | 9/2016 | Noble | ................... | H04N 23/90 |
| | | | | 345/156 |
| 2017/0351336 A1* | 12/2017 | Yang | ....................... | G06F 3/017 |
| 2018/0321826 A1* | 11/2018 | Bereza | ............... | G06F 3/04883 |
| 2018/0332205 A1* | 11/2018 | Hawthorne | ............. | G06F 1/1605 |
| 2020/0194975 A1* | 6/2020 | Gronenborn | ........ | H01S 5/02253 |
| 2020/0249752 A1* | 8/2020 | Parshionikar | ........... | G06F 3/016 |
| 2021/0103160 A1* | 4/2021 | Dehkordi | ............ | G02B 27/286 |
| 2022/0287776 A1* | 9/2022 | Stricko, III | ............ | A61B 34/25 |

* cited by examiner

REGISTERING SELECTIONS OF GRAPHICAL ELEMENTS ON ELECTRONIC DISPLAYS USING TIME-OF-FLIGHT SENSORS

BACKGROUND

Electronic displays, such as televisions or computer monitors, can display user interfaces. Some electronic displays may have screens that can detect touch from a user interacting with the user interface. The electronic displays can then perform operations related to the touch interaction with the user interface.

BRIEF DESCRIPTION OF THE DRAWINGS

Various embodiments in accordance with the present disclosure will be described with reference to the drawings, in which.

DETAILED DESCRIPTION

Figure 1:
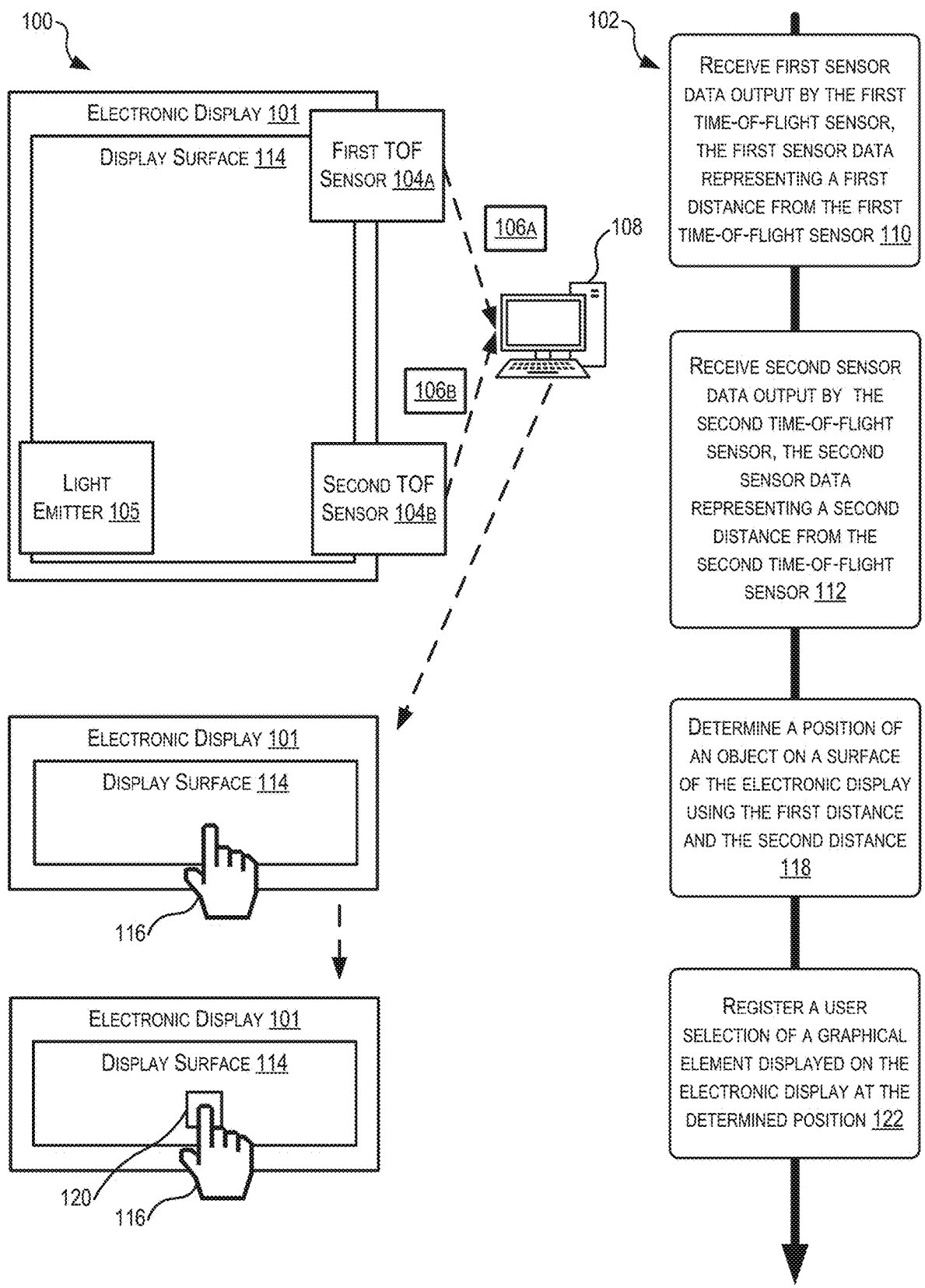
FIG. 1 illustrates an example block diagram and associated flowchart showing a process for implementing techniques relating to registering a user selection of a graphical element displayed on an electronic display using time-of-flight sensors, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, registering user selections of graphical elements on electronic displays using time-of-flight sensors. For example, an electronic display may be a television that includes a computing device, such as a control panel. Alternatively, the electronic display may be a computer monitor that is communicatively connected to a computing device. Users can interact with the surface of the electronic display to select graphical elements on the electronic display. Rather than detecting the user's touch on the electronic display using conventional approaches (e.g., capacitance sensing, resistive sensing, surface acoustic wave sensing, etc.), the computing device can register the user's selection using sensor data from time-of-flight sensors mounted to sense objects surrounding the electronic display. For example, the time-of-flight sensors can use reflected light signals to collect sensor data, such as distances between the time-of-flight sensors and an object (e.g., a user's hand extended towards the electronic display). The user selection can then be registered by the computing device based on a position determined from the sensor data.

Turning now to a particular example, an electronic display, such as a television display, a computer monitor, a smartphone display, or the like, can include one or more time-of-flight sensors. A time-of-flight sensor, such as a single-photon avalanche diode (SPAD) based sensor, can measure the distance between the sensor and an object in a two-dimensional plane. A SPAD based sensor can include a single pixel (e.g., SPAD) or an array of pixels (e.g., an array of SPADs) for detecting light. For example, a light source can emit a light signal that can be reflected by the object. The time-of-flight sensor can detect the reflected signal, which can be used to determine a distance of the object based on the time between emission of the signal and detection of the signal. The time-of-flight sensor can be mounted on the electronic display, such as on a perimeter of the electronic display, in an orientation that can allow the time-of-flight sensor to detect objects such as hands that are proximate the electronic display. A computing device electronically connected to the electronic display, such as a webserver, a personal computing device, a tablet computer, a smartphone, a control panel within the electronic display, or the like can receive and process the sensor data from the time-of-flight sensor. The computing device can determine a position of the object on a surface of the electronic display using the sensor data. For example, the computing device may determine the position of a hand on the electronic display. The computing device can also register a user selection of a graphical element displayed on the electronic display at the determined position. The graphical element may be an element on a user interface displayed on the electronic display, such as an icon for an application. For example, the hand may be positioned at the icon, and the computing device can register that a user is selecting the icon to open the application.

The techniques described herein improve the functioning of computer systems such as electronic displays with touch screens. For example, the use of time-of-flight sensors can more accurately and reliably detect a user selection on the display screen of an electronic display as compared to conventional capacitive touch screens. This can be particularly true for relatively large electronic displays such as television screens. In some examples, a single time-of-flight sensor mounted onto an electronic display using a single photon avalanche photodetector (SPAD) can measure distance to an object with an accuracy of approximately 5 mm over a distance of up to 6 meters. Additional time-of-flight sensors mounted to the electronic display can detect additional sensor data that can be used to triangulate the position of the object to even higher accuracies. Further, electronic displays with time-of-flight sensors may be manufactured at lower costs than conventional touch screen displays, particularly for larger electronic displays.

Turning now to the figures, FIG. 1 illustrates an example block diagram 100 and associated flowchart showing a process 102 for implementing techniques relating to registering a user selection of a graphical element 120 displayed on an electronic display 101 using time-of-flight sensors 104a-b, according to at least one example. The diagram 100 depicts devices, objects, and the like that correspond to the process 102. The process 102 can be performed by any suitable combination of hardware, as described herein.

Figure 14:
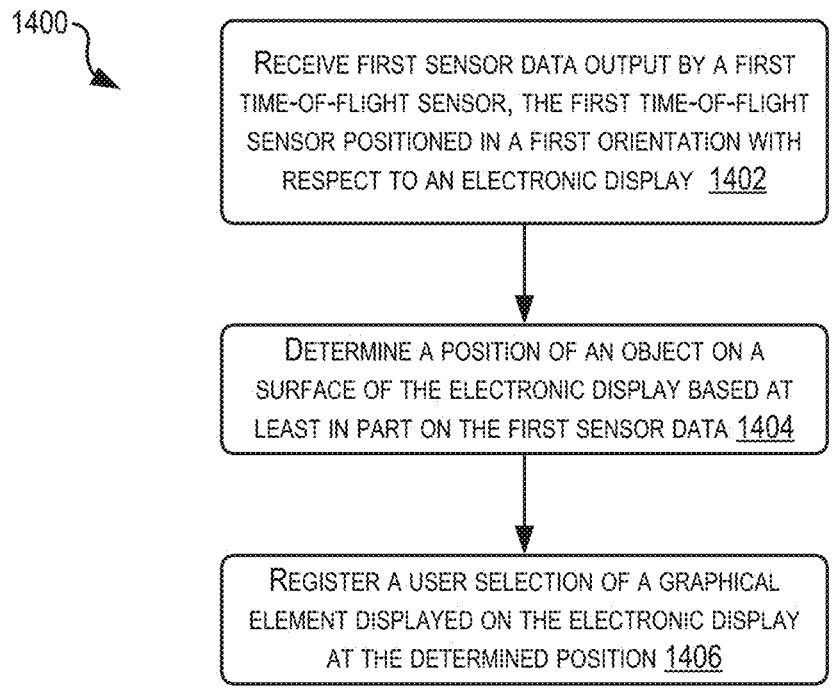
FIG. 14 illustrates an example flowchart showing a process for implementing techniques relating to registering a user selection of a graphical element displayed on an electronic display using time-of-flight sensors, according to at least one example.

FIGS. 1 and 14 illustrate example flow diagrams showing respective processes 102 and 1400 as described herein. The processes 102 and 1400 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the processes 102 and 1400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 110 by the computing device 108 receiving first sensor data 106a from a first time-of-flight (TOF) sensor 104a mounted to an electronic display 101. The computing device 108 may be included in the electronic display 101. In other examples, the computing device 108 can be external to the electronic display 101. In either case, the computing device 108 may be communicatively connected to the time-of-flight sensors 104a-b via a wired connection or a wireless connection. The first time-of-flight sensor 104a can sense objects, such as a hand or finger, in front of a display surface 114 of the electronic display 101. For example, the first time-of-flight sensor 104a may detect objects in a two-dimensional plane along the display surface 114, or in a three-dimensional space in front of the display surface 114. Example time-of-flight sensors can include single-photon avalanche diodes, silicon photomultipliers, light detection and ranging arrays (LiDAR), and the like. In some examples, the first time-of-flight sensor 104a can include a single pixel that can detect the first sensor data 106a. The first sensor data 106a can represent a first distance from the first time-of-flight sensor 104a. For example, the first time-of-flight sensor 104a can detect signals, such as light signals, reflected off of an object 116 in front of the display surface 114. The light signals may be emitted by the first time-of-flight sensor 104a or by a separate light emitter 105 that is also mounted on the electronic display 101. The first sensor data 106a can include a time difference between emission of the light signals and detection of the returned light signals by the first time-of-flight sensor 104a. The time difference can be associated with the first distance between the time-of-flight sensor 104a and the object 116.

The process 102 can continue at block 112 by the computing device 108 receiving second sensor data 106b output by a second time-of-flight (TOF) sensor 104b. The second sensor data 106b can represent a second distance from the second time-of-flight sensor 104b. The second time-of-flight sensor 104b may be mounted on the electronic display 101 at an orientation that differs from that of the first time-of-flight sensor 104a. The different orientation may allow the second time-of-flight sensor 104b to sense objects along different or overlapping zones of the two-dimensional plane of the display surface 114 as compared to the first time-of-flight sensor 104a. The second time-of-flight sensor 104b may be a same or different type of sensor than the first time-of-flight sensor 104a. In some examples, the time-of-flight sensors 104a-b can be single pixel sensors. Alternatively, one or both of the time-of-flight sensors 104a-b can include two or more pixels. For example, one or both of the time-of-flight sensors 104a-b can include pixel arrays. In one particular example, the first time-of-flight sensor 104a can include two or more pixels. Each pixel in the first time-of-flight sensor 104a may be associated with a zone of a field of view of the first time-of-flight sensor 104a. The first sensor data 106a can further represent a position of an object 116 in a particular zone of the field of view associated with a particular pixel of the time-of-flight sensor 104a.

The process 102 can continue at block 118 by the computing device 108 determining a position of an object 116 on the display surface 114 of the electronic display 101 using the first sensor data 106a and the second sensor data 106b. For example, the computing device 108 can map the first distance represented by the first sensor data 106a and the second distance represented by the second sensor data 106b to a set of coordinates on a two-dimensional plane that corresponds to the display surface 114. The computing device 108 may use the first distance and the second distance to triangulate the position of the object 116 to a particular coordinate for the two-dimensional plane. In some examples, the time-of-flight sensors 104a-b can include sensor data 106a-b representing locations of the object 116 in a three-dimensional space in front of the display screen.

The process 102 can continue at block 122 by the computing device 108 registering a user selection of a graphical element 120 displayed on the electronic display 101 at the determined position. For example, the computing device 108 can determine that the coordinate of the position on the electronic display 101 is associated with a position of a graphical element 120 on the display surface 114. Examples of the graphical element 120 can include an icon, a link, a button, or any other interactive element displayed as part of a user interface on the display surface 114. The computing device 108 can register that the detection of the object at the determined position is due to a user selecting the graphical element 120. The user selection can include any interaction with the user interface, including the graphical element 120. For example, the user selection can include opening a link or an application, highlighting a portion of text on the user interface, pressing a button on the user interface, scrolling across a page on the user interface, dragging a graphical element 120 from a first position to a second position, or the like. The computing device 108 can then execute an operation associated with the graphical element 120, such as opening a link selected in the user selection.

Figure 2:
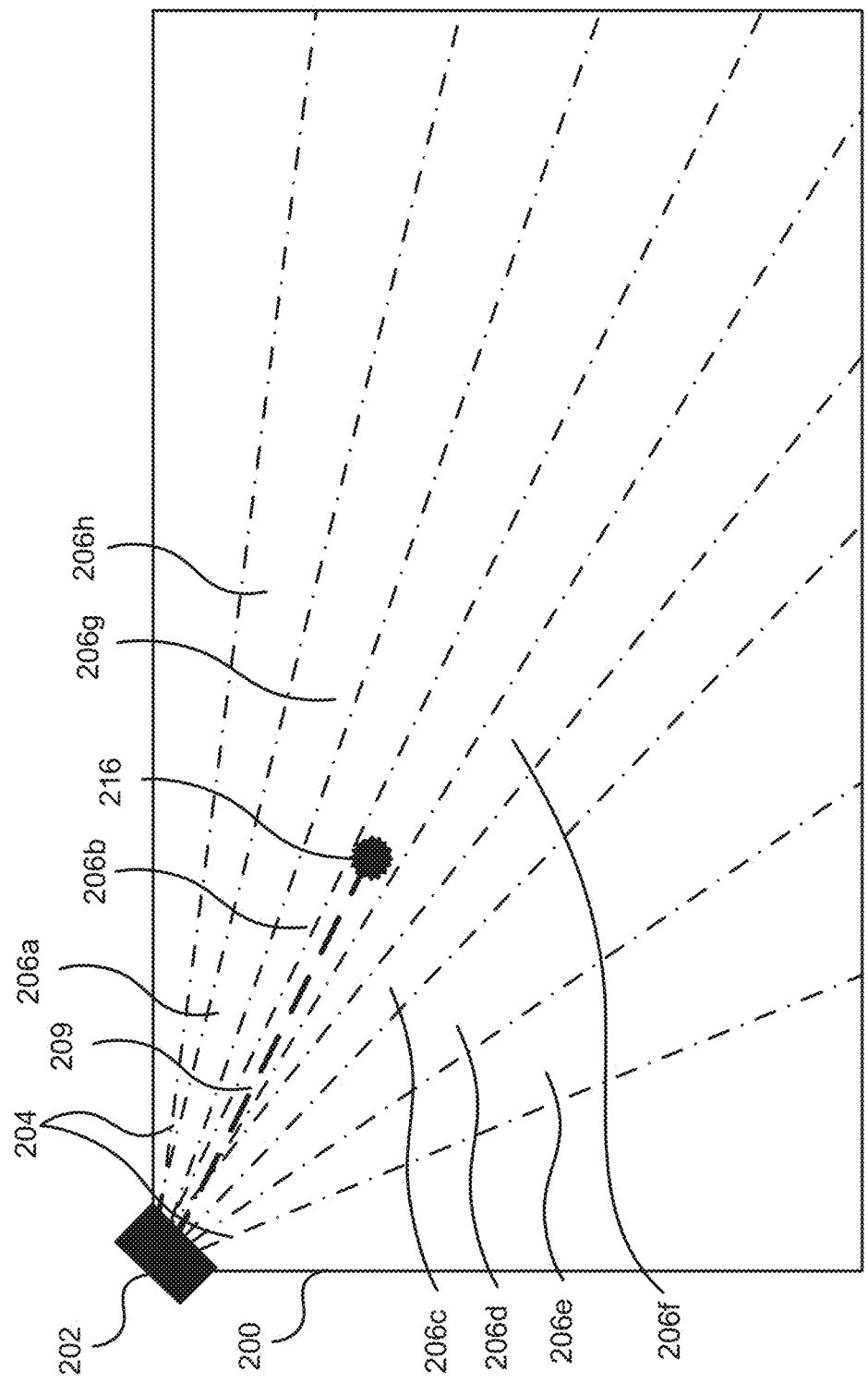
FIG. 2 illustrates an example block diagram of an electronic display including a single time-of-flight-sensor, according to at least one example.

FIG. 2 illustrates an example block diagram of an electronic display 200 including a single time-of-flight sensor 202, according to at least one example. The time-of-flight sensor 202 is an example of the time-of-flight sensors 104, and the electronic display 200 is an example of the electronic display 101. The time-of-flight sensor 202 can be mounted on the electronic display 200, such as on a perimeter of the electronic display 200, at a particular orientation with respect to the electronic display 200. The orientation of the time-of-flight sensor 202 can affect a field of view 204 on a surface of the electronic display 200. The surface of the electronic display 200 can be represented by a two-dimensional plane that generally corresponds in size to the surface of the electronic display 200, and the field of view 204 can intersect the two-dimensional plane, be parallel with the two-dimensional plane, and oriented in other ways with respect to the two-dimensional plane. The two-dimensional plane can be a plane that is parallel to a planar surface of the electronic display 200. In some examples, the two-dimensional plane can be defined directly on the planar surface of the electronic display 200. In other examples, the two-dimensional plane can be defined as being spaced at an offset from the planar surface of the electronic display 200. For example, the two-dimensional plane may be offset by one inch from the planar surface of the electronic display 200. The field of view 204 can be an area in which the time-of-flight sensor 202 can detect a distance between the time-of-flight sensor 202 and an object 216, such as a hand moving within the two-dimensional plane. In examples where the two-dimensional plane is defined directly on the planar surface of the electronic display 200, the time-of-flight sensor 202 may detect a distance between the time-of-flight sensor 202 and an object 216 that touches the planar surface of the electronic display 200. In other examples where the two-dimensional plane is offset from the planar surface of the electronic display 200, the time-of-flight sensor 202 may detect a distance between the time-of-flight sensor 202 and an object 216 that is positioned at the offset between the time-of-flight sensor 202 and the electronic display 200. This can allow a user to interact with the electronic display 200 without touching the electronic display 200.

The time-of-flight sensor 202 may include a single pixel. In other examples, the time-of-flight sensor 202 can include an array of pixels, such as an 8×8 array of pixels. The number of detection zones 206 in the field of view 204 can be defined by a number of pixels in the time-of-flight sensor 202. For example, as illustrated in FIG. 2, the time-of-flight sensor 202 can detect distances of objects 216 in 8 distinct detection zones 206a-h in the field of view 204. Such a time-of-flight sensor 202 may include an 8×8 array of pixels. Each pixel in the time-of-flight sensor 202 can be associated with a particular detection zone 206. For example, the time-of-flight sensor 202 can include optical elements (such as lenses, mirrors, or the like) in front of one or more pixels to direct a detection zone 206 to project across a region of the electronic display 200. In some examples, a first subset of the array of pixels (e.g., 8 pixels in the 8×8 array of pixels that are aligned with the electronic display 200) can be used to detect sensor data. Sensor data detected by a second subset of the array of pixels that includes pixels not in the first subset of the array of pixels may be disregarded. Alternatively, sensor data detected by the second subset of the array of pixels may be used to triangulate the position of the object 216, or to detect gestures of the object in a three-dimensional space in front of the electronic display 200.

The time-of-flight sensor 202 may detect sensor data that includes signals reflected from an object 216, which is an example of the object 116, that is positioned within the field of view 204. The reflected signals can represent a distance 209 between the time-of-flight sensor 202 and the object 216. The time-of-flight sensor 202 may additionally detect sensor data that identifies a particular detection zone 206 within the field of view 204 at which the object 216 is positioned. For example, the sensor data can include that the object 216 is positioned within detection zone 206b. The time-of-flight sensor 202 can transmit sensor data that includes the distance 209 and the identified detection zone 206b to the computing device 108 to determine the position of the object 216.

Figure 3:
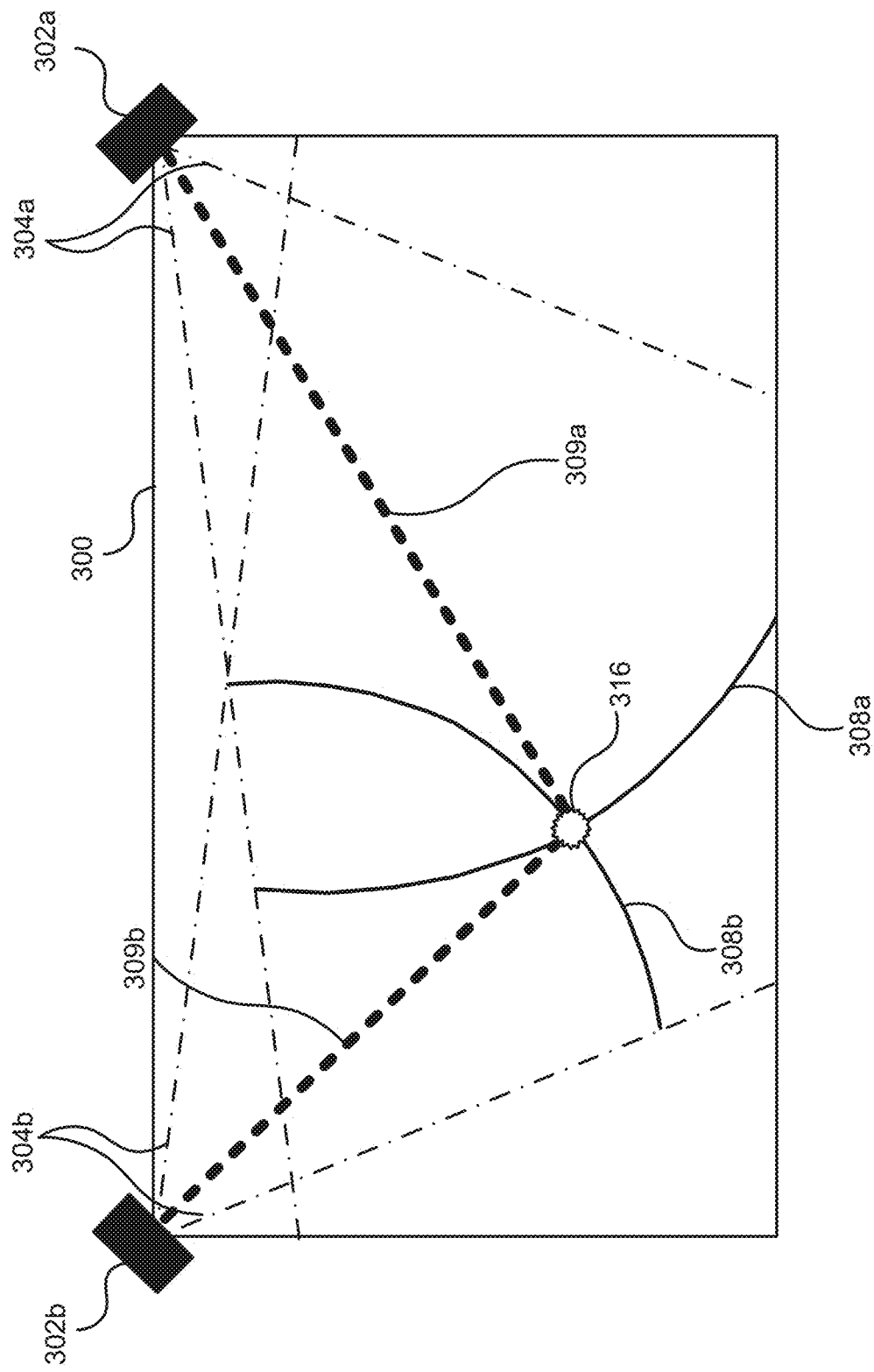
FIG. 3 illustrates an example block diagram of an electronic display including two time-of-flight sensors, according to at least one example.

FIG. 3 illustrates an example block diagram of an electronic display 300 including two time-of-flight sensors 302a-b, according to at least one example. The time-of-flight sensors 302a-b are examples of the time-of-flight sensors 104, and the electronic display 300 is an example of the electronic display 101. The first time-of-flight sensor 302a can be mounted at a first orientation on the electronic display 300 to have a first field of view 304a along a surface of the electronic display 300. The second time-of-flight sensor 302b can be mounted at a second orientation on the electronic display 300 to have a second field of view 304 along the surface of the electronic display 300. In some examples, as illustrated in FIG. 3, the fields of view 304a-b can overlap. The electronic display 300 can further include a light source (not pictured) that is modified to emit a planar sheet of light (e.g., using a cylindrical lens, a diffractive optical element, or a metalens). The first time-of-flight sensor 302a can be a single pixel sensor. As such, the first time-of-flight sensor 302a may have a single detection zone that includes the entirety of the first field of view 304a. As depicted in FIG. 3, the second time-of-flight sensor 302b can also be a single pixel sensor. In other examples, one or both of the time-of-flight sensors 302a-b can include at least two pixels. For example, the second time-of-flight sensor 302b can include an 8×8 array of pixels, and can have approximately 8 detection zones in the second field of view 304b. The second time-of-flight sensor 302b can be an example of the time-of-flight sensor 202. Including an additional time-of-flight sensor can allow for increased accuracy and spatial resolution of objects as compared to the electronic display 200 with a single time-of-flight sensor 202. Spacing the time-of-flight sensors 302a-b at a distance, such as at separate corners, or at particular angles relative to one another, such as right angles, may additionally increase the accuracy and spatial resolution. Alternatively or additionally, an electronic display with a single time-of-flight sensor including multiple pixels may have greater accuracy and spatial resolution than an electronic display with a single time-of-flight sensor with a single pixel.

The time-of-flight sensors 302a-b may detect sensor data related to an object 316 that is positioned proximate a two-dimensional plane that represents a surface of the electronic display 300. For example, the first time-of-flight sensor 302a may identify that the object 316 is positioned within a first detection zone (e.g., the first field of view 304a). The sensor data can additionally include a first distance 309a detected by the first time-of-flight sensor 302a as a distance between the object 316 and the first time-of-flight sensor 302a. The first distance 309a can be based on a time difference between emission of light signals from the light emitting source and detection of light signals reflected by the object 316. As illustrated in FIG. 3, the first distance 309a can correspond to an arc 308a of potential positions at which the object 316 may be located along the electronic display 300.

Sensor data for the second time-of-flight sensor 302b can also include identified detection zones and distances. The second time-of-flight sensor 302b may identify that the object 316 is positioned within its second field of view 304b. The sensor data can additionally include a second distance 309b detected by the second time-of-flight sensor 302b. The second distance 309b can be based on a time difference between emission of light signals from the light emitting source and detection of light signals reflected by the object 316. The second distance 309b can correspond to an arc 308b of potential positions at which the object 116 may be located along the electronic display 300.

The time-of-flight sensors 302a-b can transmit their sensor data to a computing device, such as computing device 108 depicted in FIG. 1. The computing device 108 can determine a position 310 based on the sensor data. For example, the computing device 108 can map the first detection zone (e.g., field of view 304a), the first distance 309a, the second detection zone (e.g., field of view 304b), and the second distance 309b to a set of coordinates on the two-dimensional plane. The computing device 108 can determine a coordinate at which the first distance 309a intersects the second distance 309b within the first detection zone and the second detection zone. The coordinate can be the position of the object 316 with respect to the electronic display 300. In some examples, the two time-of-flight sensors 302a-b on the electronic display 300 can be used to obtain spatial resolution of the position of the object 316 to within 1 cm.

Figure 4:
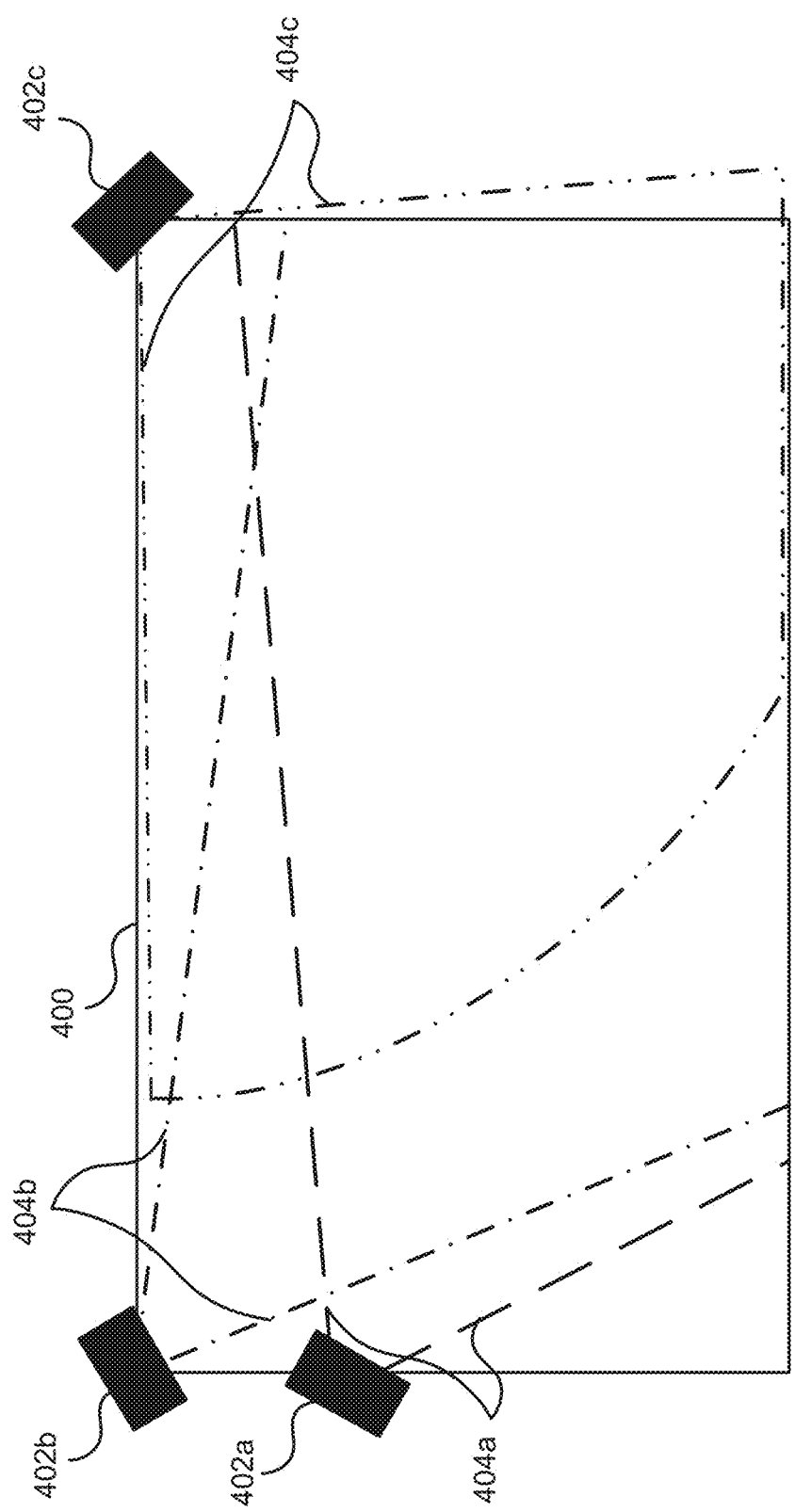
FIG. 4 illustrates an example block diagram of an electronic display including three time-of-flight sensors, according to at least one example.

FIG. 4 illustrates an example block diagram of an electronic display 400 including three time-of-flight sensors 402a-c, according to at least one example. The time-of-flight sensors 402a-c are examples of the time-of-flight sensors 104, and the electronic display 400 is an example of the electronic display 101. The first time-of-flight sensor 402a can be mounted to the electronic display 400 at a first orientation to have a first field of view 404a. The second time-of-flight sensor 402b can be mounted to the electronic display 400 at a second orientation to have a second field of view 404b. The third time-of-flight sensor 402c can be mounted to the electronic display 400 at a third orientation to have a third field of view 404c. The fields of view 404a-c can intersect a two-dimensional plane representing a surface of the electronic display 400. Each field of view 404a-c may also intersect one or more of the other fields of view. The time-of-flight sensors 402a-c can be used to detect a position of an object with respect to the electronic display 400 in the same manner as described above.

In some examples, the orientations of the time-of-flight sensors 402a-c may allow the fields of view 404a-c to intersect a three-dimensional space proximate the surface of the electronic display 400. The three-dimensional space can represent a space in front of the electronic display 400 at which a user can interact with the electronic display 400. For example, the time-of-flight sensors 402a-c may detect a gesture associated with an object in the three-dimensional space. Examples of the gesture can include an arm moving from a first position to a second position or a pair of fingers moving closer together or farther apart. The time-of-flight sensors 402a-c may detect sensor data including a set of detected distances and detection zones for the gesture in a three-dimensional space. The computing device 108 can receive the sensor data and can determine one or more positions of the gesture based on the sensor data. The computing device 108 can also map the positions of the gesture to the two-dimensional plane that represents the surface of the electronic display 400, and can determine a user selection or operation associated with the gesture. For example, the computing device 108 may determine that the arm moving from the first position to the second position is a "swiping" user operation for scrolling down a web page. In another example, the computing device 108 may determine that the pair of fingers moving closer together is a "zooming out" user operation for adjusting a size of a web page. In some examples, the computing device 108 can determine a three-dimensional position of the object or the gesture relative to the electronic display 400 using the sensor data.

Figure 5:
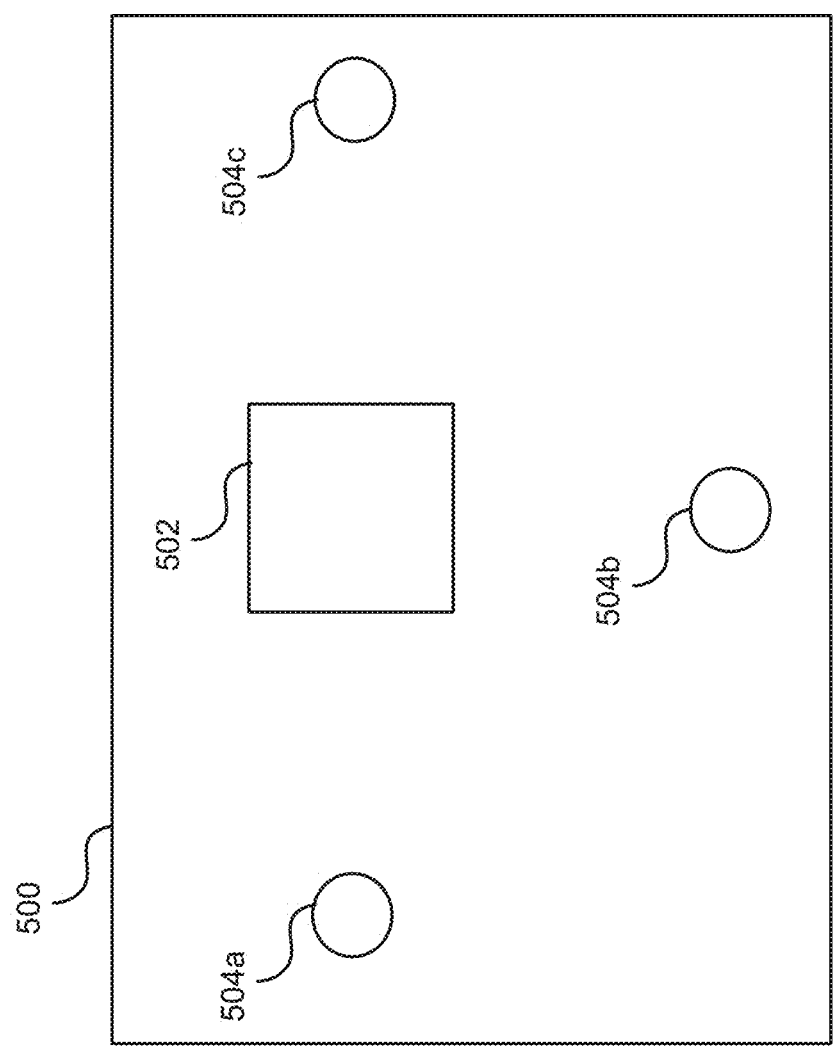
FIG. 5 illustrates an example block diagram of time-of-flight sensor including one detector and three light sources, according to at least one example.

FIG. 5 illustrates an example block diagram of a time-of-flight sensor 500 including one detector 502 and three light sources 504a-c, according to at least one example. The time-of-flight sensor 500 is an example of the time-of-flight sensors 104 mounted on the electronic display 101. The time-of-flight sensor 500 may be mounted on an electronic display to detect sensor data related to an object proximate the electronic display in a similar manner as described above. Including multiple light sources, such as the three light sources 504a-c illustrated in FIG. 5, can allow a single time-of-flight sensor 500 with a single pixel as the detector 502 to reliably and accurately detect distances to objects proximate the electronic display.

Examples of the light sources 504a-c can include surface emitting lasers such as vertical-cavity surface-emitting lasers (VCSEL) or any other suitable light emitting source. The light sources 504a-c can be positioned at a distance from the detector 502 within the time-of-flight sensor 500 that exceeds the error range of the detector 502. For example, the light sources 504a-c can be positioned at least 1 cm away from the detector 502. The detector 502 can receive light signals reflected from an object that were emitted by each of the light sources 504a-c at distinct times. Thus, the light signals can be time-multiplexed.

For example, for an object at position $(x_1, y_1, z_1)$, the roundtrip time of a particular received signal on the detector 502 can depend on the relative positions of the detector 502 and the light sources 504a-c with respect to the object. Given three separate detection times for signals generated by each of the light sources 504a-c, the detector 502 can detect three detection times $(t_1, t_2, t_3)$ corresponding to twice the roundtrip distance D using the following equation: $t_n = 2*D_n/c$. The computing device 108 can then detect the coordinates $(x_1, y_1, z_1)$ from the detection times $t_n$ and distances $D_n$.

Figure 6:
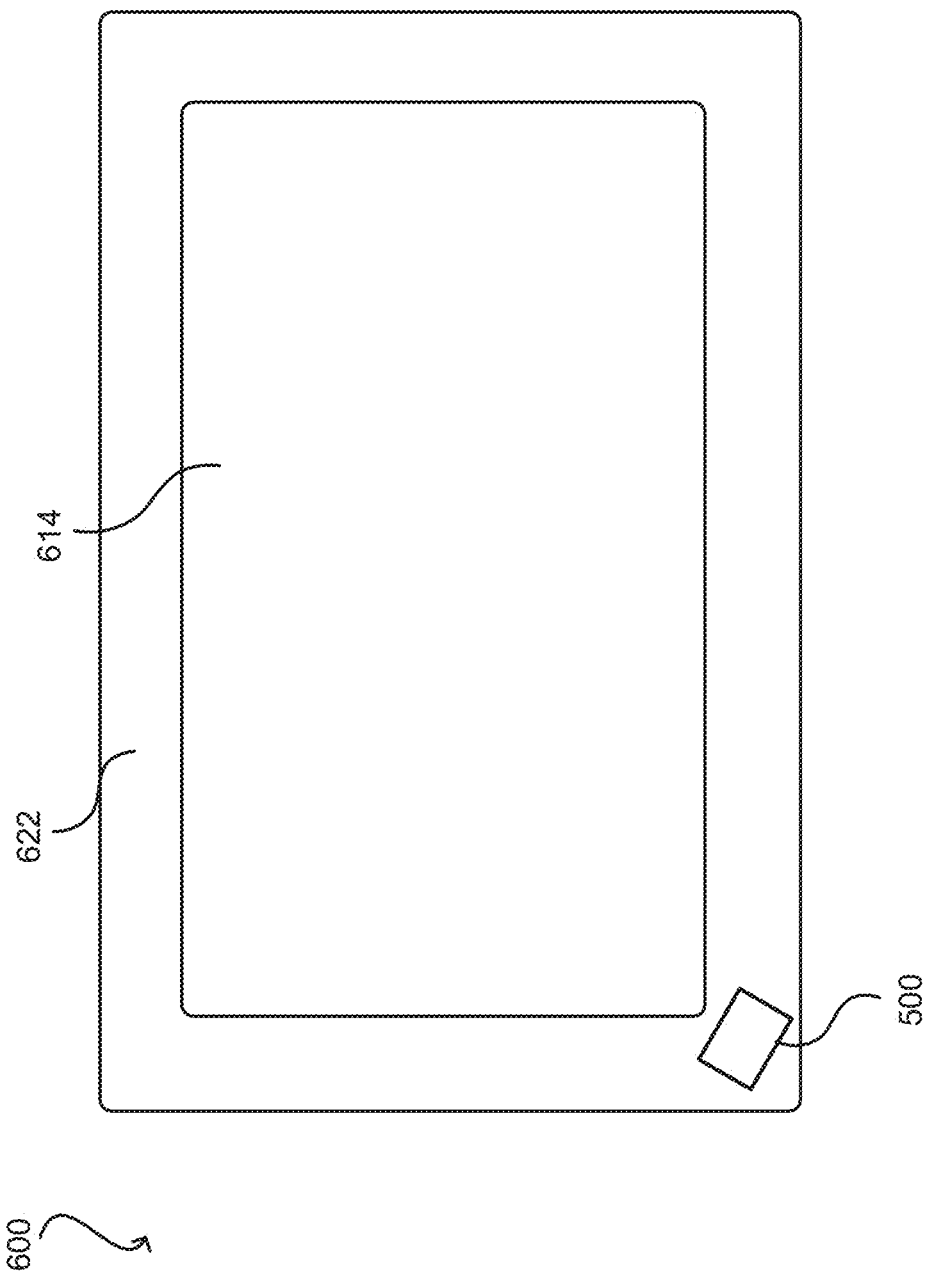
FIG. 6 illustrates an example block diagram of an electronic display including a time-of-flight sensor, according to at least one example.

In some examples, the time-of-flight sensor 500 can include the light sources 504a-c and the detector 502 within a single housing that can be mounted onto an electronic display. Such an example is depicted in FIG. 6, which illustrates an example block diagram of an electronic display 600 including the time-of-flight sensor 500, according to at least one example. The electronic display 600 is an example of the electronic display 101 and can include a display surface 614 that can display a user interface to a user. The time-of-flight sensor 500 can be mounted within a bezel 622 of the electronic display 600. That is, the time-of-flight sensor can be mounted between an outer edge of the display surface 614 in the electronic display 600 and an outer edge of the electronic display 600. The signals emitted by the light sources 504a-c can be emitted at different times and received by the time-of-flight sensor 500 at different times after being reflected by an object, which can improve accuracy of detection of the object.

Figure 7:
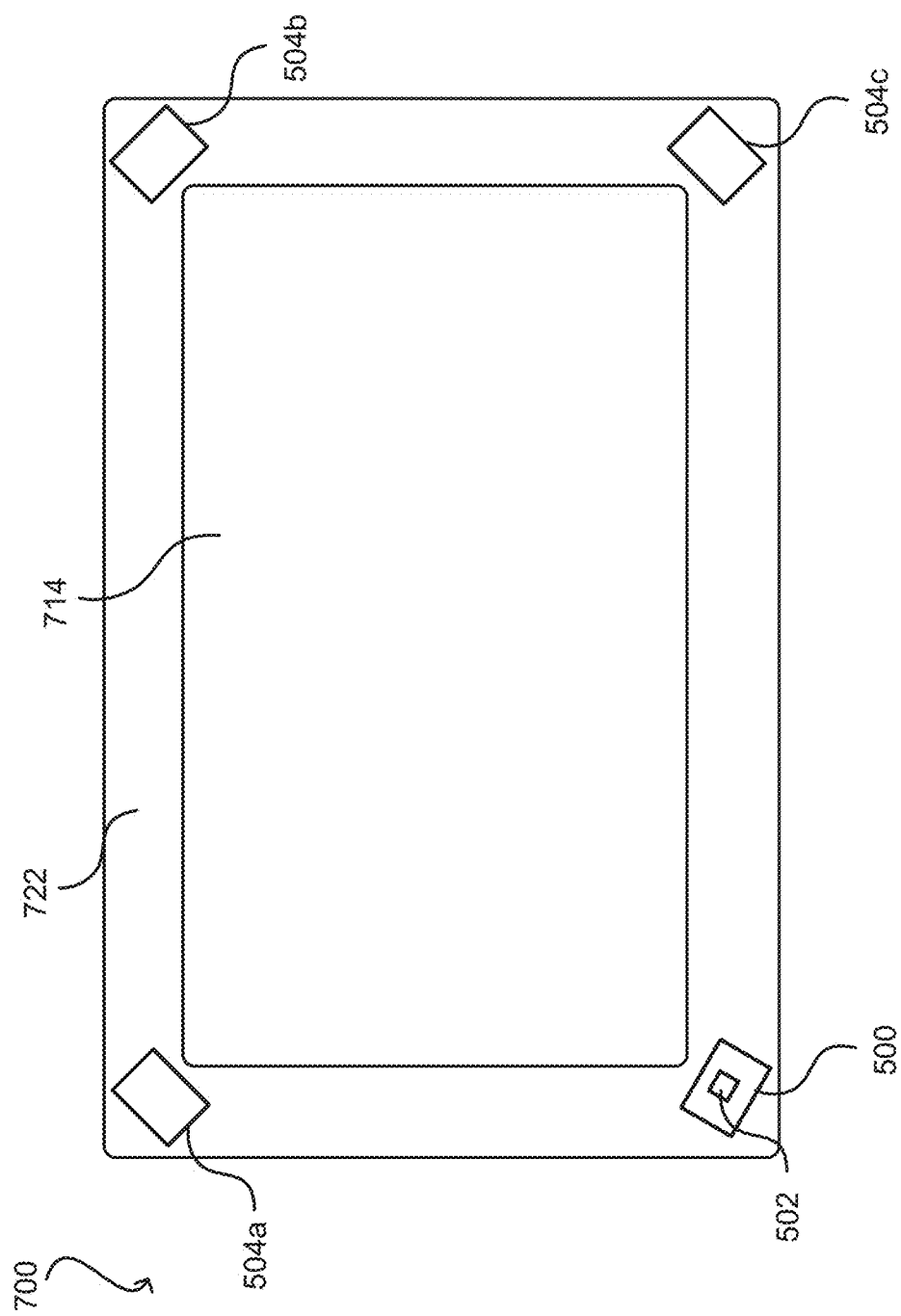
FIG. 7 illustrates an example block diagram of an electronic display including a time-of-flight sensor and three light sources, according to at least one example.

In other examples, the light sources 504a-c may not be included in the same housing of the time-of-flight sensor 500 as the detector 502. Instead, the light sources 504a-c may be mounted to an electronic display at a distance from the time-of-flight sensor 500 that includes the detector 502. Such an example is depicted in FIG. 7, which illustrates an example block diagram of an electronic display 700 including the time-of-flight sensor 500 and three light sources 504a-c, according to at least one example. The electronic display 700 is an example of the electronic display 101 and can include a display surface 714 that can display a user interface to a user. The time-of-flight sensor 500, including the detector 502 (not depicted), can be mounted within a bezel 722 of the electronic display 700. The three light sources 504a-c, which can be separate from the time-of-flight sensor 500, can also be mounted within the bezel 722. For example, the light sources 504a-c can be mounted at the other corners of the electronic display 700. The distance between each light source 504a-c and the time-of-flight sensor 500 can affect the amount of time for the time-of-flight sensor 500 to detect signals emitted from the light sources 504a-c. Additionally, each light source 504a-c may emit signals at differing times. The distances of the light sources 504a-c and the differing times of emission can allow the time-of-flight sensor 500 to more accurately detect objects near the electronic display 700.

Figure 8:
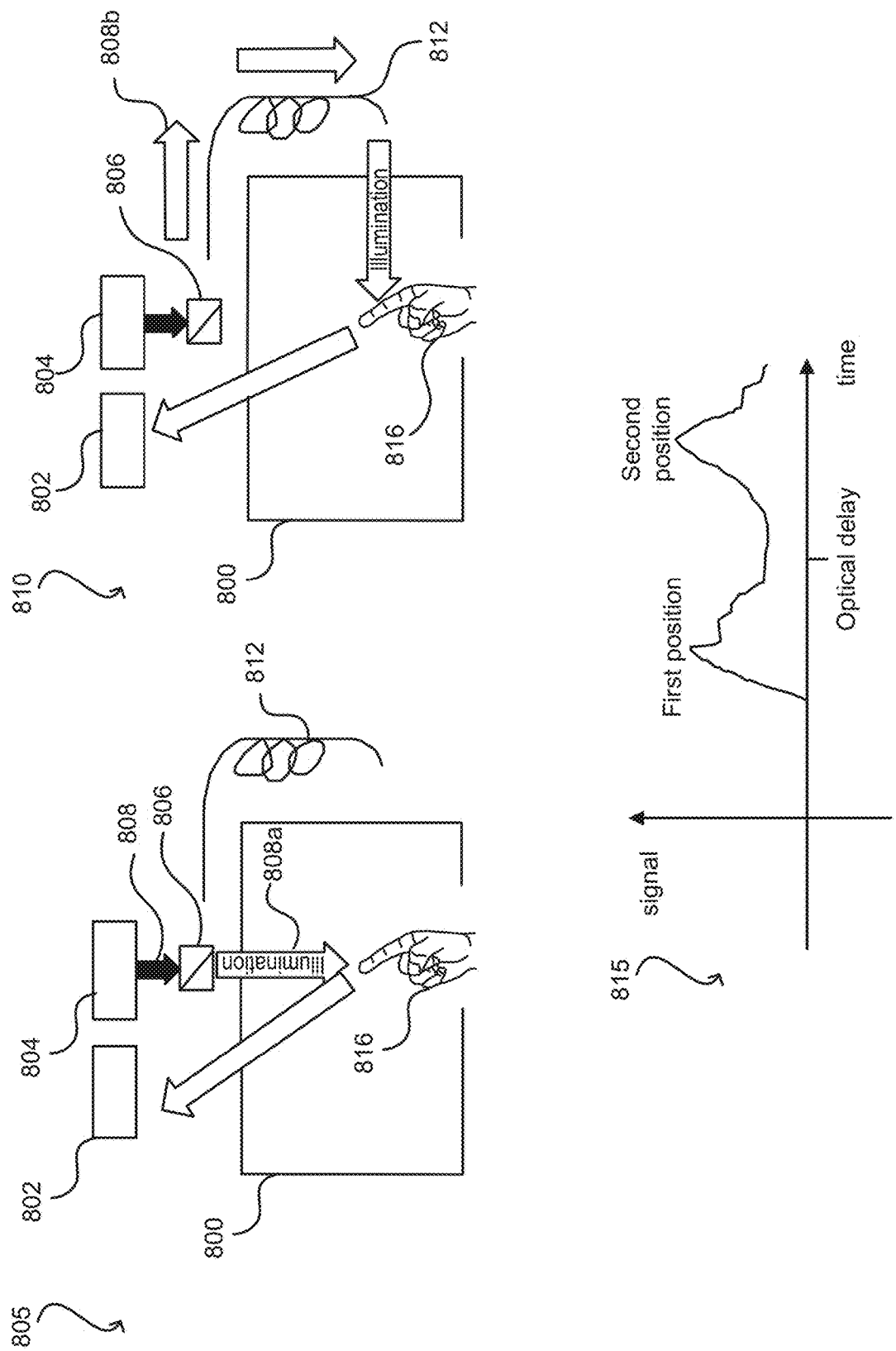
FIG. 8 illustrates an example block diagram of an electronic display including a light source, a time-of-flight sensor, and a light transport media, according to at least one example.

FIG. 8 illustrates an example block diagram of an electronic display 800 including a light source 804, a time-of-flight sensor 802, and a light transport media 812, according to at least one example. The time-of-flight sensor 802 is an example of the time-of-flight sensors 104, and the electronic display 800 is an example of the electronic display 101. Incorporating the light transport media 812 into the electronic display 800 may allow for increased accuracy of object detection for a single time-of-flight sensor. For example, the time-of-flight sensor 802 can be a single pixel SPAD based sensor. In other examples, the time-of-flight sensor 802 can be a SPAD based sensor that includes an N×M array of pixels, where N and M are both greater than one. For example, the SPAD based sensor may include an 8×8 array of pixels. In some examples, the light source 804 can be a VCSEL or other suitable light emitter. In order to reduce a number of time-of-flight sensors required to register user selections for the electronic display 800, the light source 804 can emit light signals that are received by a beam splitter 806 mounted on the electronic display proximate the light source 804. The beam splitter 806 can split the light signal into two beams that are detected by the time-of-flight sensor 802 at different times. The different times of detection can aid in determining a position of an object 816 relative to the electronic display 800.

For example, at step 805, the light source 804 can emit a light signal 808. The light signal 808 can pass through a beam splitter 806 before entering the field of view of the time-of-flight sensor 802. The beam splitter 806 can split the light signal 808 into a first light 808a that can be emitted from the beam splitter 806 and propagated in the direction of an object 816, such as a hand, that is proximate the electronic display 800. The first light 808a can be reflected by the object 816 and can be detected by the time-of-flight sensor 802 at a first time. The time-of-flight sensor 802 can detect sensor data from the first light 808a in the same manner as described above.

At step 810, the beam splitter 806 can additionally split the light signal 808 into a second light 808b that can be emitted from the beam splitter 806 into a light transport media 812. Examples of the light transport media 812 can include an optical fiber (as illustrated in FIG. 8), prisms, luminescent solar concentrators, lenses, or mirrors. The second light 808b can propagate onto or through the light transport media 812 before being transmitted in the direction of the object 816 proximate the electronic display 800. The second light 808b can then be reflected off of the object 816 and can be detected by the time-of-flight sensor 802 at a second time that is later than the first time.

The time-of-flight sensor 802 can generate the photon histogram 815 displaying the delay in time between the split light signals. The delay in time can be related to distance from the object 816. For example, instead of one target for the object 816, two targets can be detected at different distances. The distances are based on the position of the object 816 and the optical delay. The two distances may be depicted as two peaks in the photon histogram 815. Because the delay from the light transport media 812 is constant and known, the computing device 108 can differentiate between each illumination distance in the photon histogram 815 to determine the absolute distance based on the two distances. Thus, the computing device 108 can compute a triangulation of the distances to determine a position of the object 816 and to register a user selection based on the position of the object 816.

Figure 9:
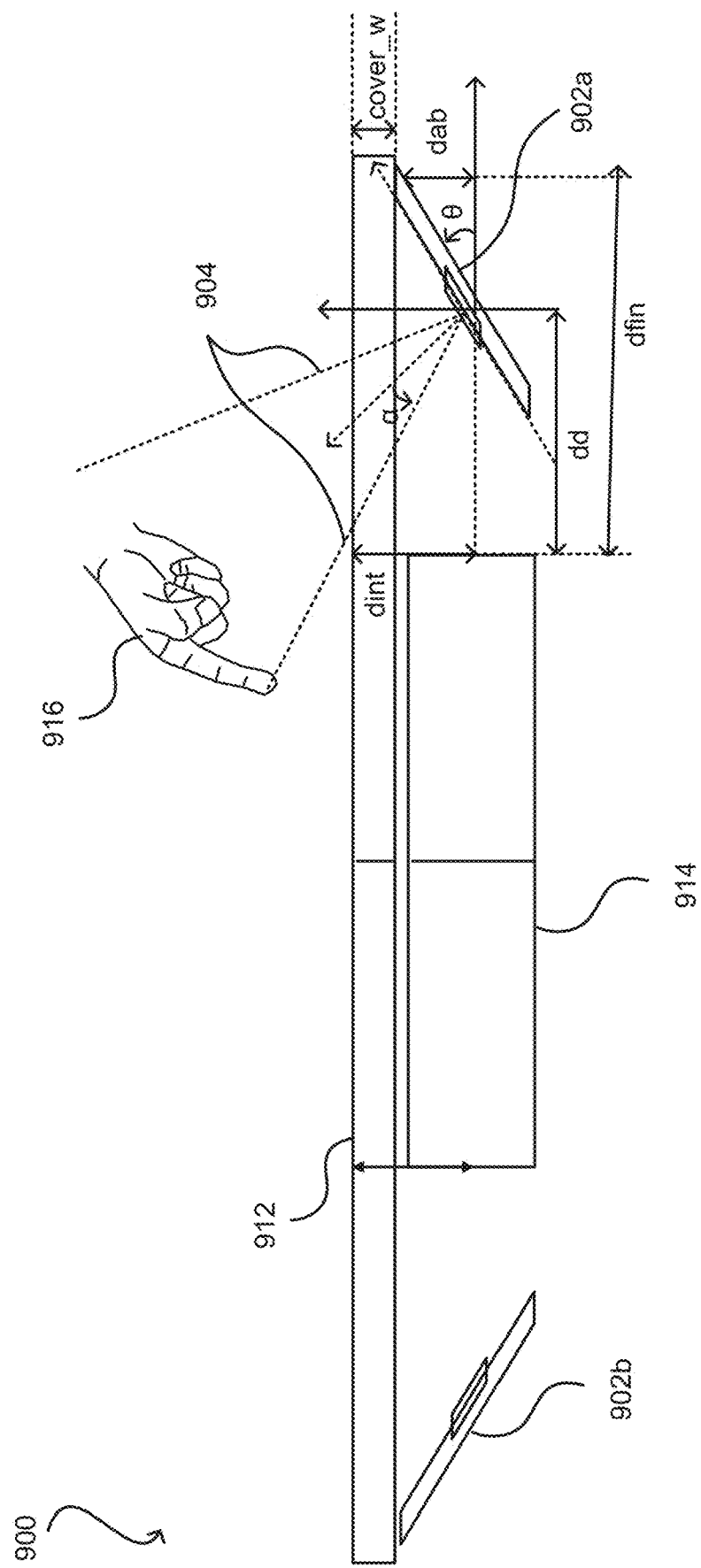
FIG. 9 illustrates an example profile view of an electronic display including two time-of-flight sensors, according to at least one example.
Figure 10:
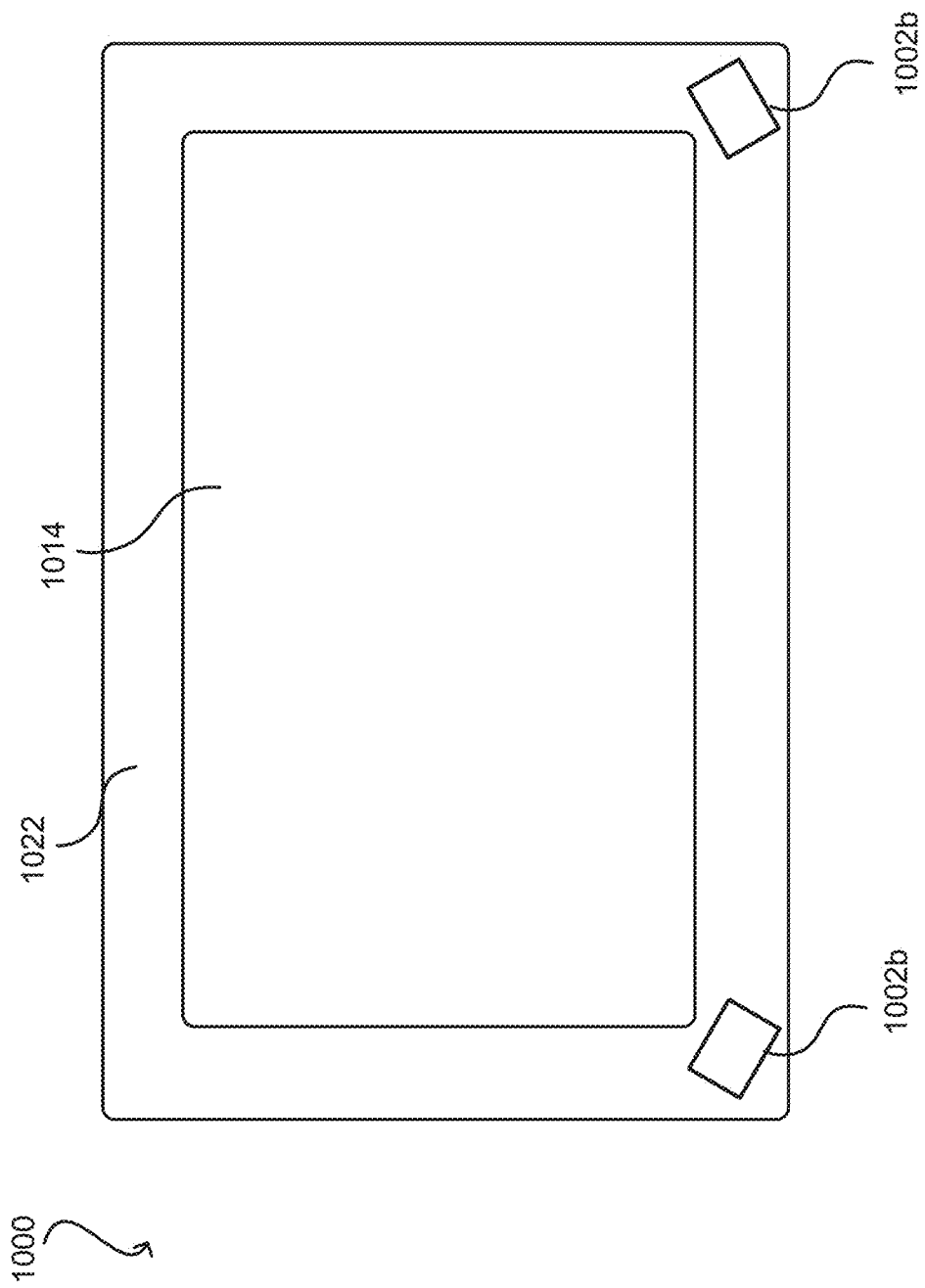
FIG. 10 illustrates an example front view of an electronic display including two time-of-flight sensors, according to at least one example.

FIG. 9 illustrates an example profile view of an electronic display 900 including two time-of-flight sensors 902a-b, according to at least one example. The time-of-flight sensors 902a-b are examples of the time-of-flight sensors 104, and the electronic display 900 is an example of the electronic display 101. The electronic display 900 can include a display surface 914 that can display a user interface to a user. The time-of-flight sensors 902a-b can be mounted on the electronic display 900 adjacent to the display surface 914 at different orientations. The electronic display 900 can further include a cover glass 912 that can cover the display surface 914 and the time-of-flight sensors 902a-b. The time-of-flight sensors 902a-b can be positioned within a bezel of the electronic display 900. For example, a front view of such a positioning is depicted in FIG. 10, which illustrates an example electronic display 1000 including two time-of-flight sensors 1002a-b. The time-of-flight sensors 1002a-b are examples of the time-of-flight sensors 104, and the electronic display 1000 is an example of the electronic display 101. The time-of-flight sensors 1002a-b are each mounted within a bezel 1022 of the electronic display 101. That is, the time-of-flight sensors 1002a-b are mounted between an outer edge of a display surface 1014 in the electronic display 1000 and an outer edge of the electronic display 1000.

Figure 11:
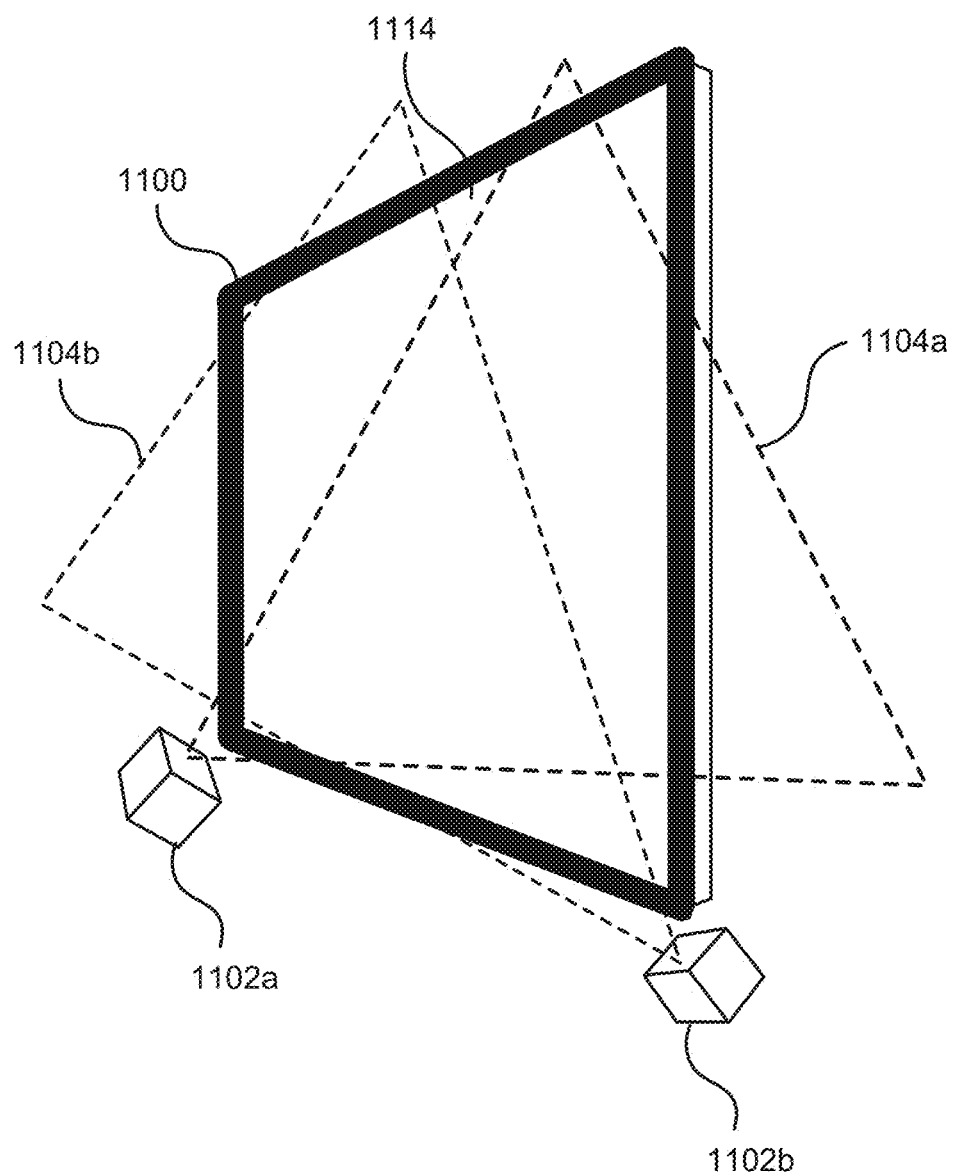
FIG. 11 illustrates an example perspective view of an electronic display including two time-of-flight sensors, according to at least one example.

The time-of-flight sensors 1002*a-b* can be positioned at various orientations with respect to the electronic display 1000. The orientation of the time-of-flight sensors 1002*a-b* and the size of the display surface 1014 can affect the shape and size of their resulting fields of view. In one example, the time-of-flight sensors 1002*a-b* can be oriented in a "bottom-up" configuration, such that fields of view for the time-of-flight sensors 1002*a-b* can be directed up towards a top of the electronic display 1000. Such an example is depicted in FIG. 11, which illustrates an example perspective view of an electronic display 1100 including two time-of-flight sensors 1102*a-b*, according to one example. The time-of-flight sensors 1102*a-b* are examples of the time-of-flight sensors 104, and the electronic display 1100 is an example of the electronic display 101. The time-of-flight sensors 1102*a-b* are positioned below a display screen 1114 for the electronic display 1100 and are angled towards the display screen 1114 and upwards. The angle and position of the time-of-flight sensors 1102*a-b* can result in triangular fields of view 1104*a-b* in which the time-of-flight sensors 1102*a-b* can detect objects. Each field of view 1104*a-b* can intersect a 2-dimensional plane of the display screen 1114. In some examples, as illustrated in FIG. 11, the field of view 1104*a* can overlap the field of view 1104*b*.

A location of an object detected in overlapping regions of the fields of view 1104*a-b* may be determined by triangulating sensor data received from each of the time-of-flight sensors 1102*a-b*. The "bottom-up" configuration of the time-of-flight sensors 1102*a-b* can allow the electronic display 1100 to mimic a touch screen experience due to the overlapping fields of view 1104*a-b* in front of the display screen 1114. Additionally, triangulating the sensor data from the two time-of-flight sensors 1102*a-b* can provide much higher resolution in detecting a location of an object as compared to the use of a single time-of-flight sensor. In some examples, the two time-of-flight sensors 1102*a-b* in the "bottom-up" configuration can additionally detect gestures of an object in front of the display screen 1114, such as a wave of an arm. However, because the fields of view 1104*a-b* are one-dimensional, the two time-of-flight sensors 1102*a-b* may be limited to detecting gestures that are relatively close to the display screen 1114.

Figure 12:
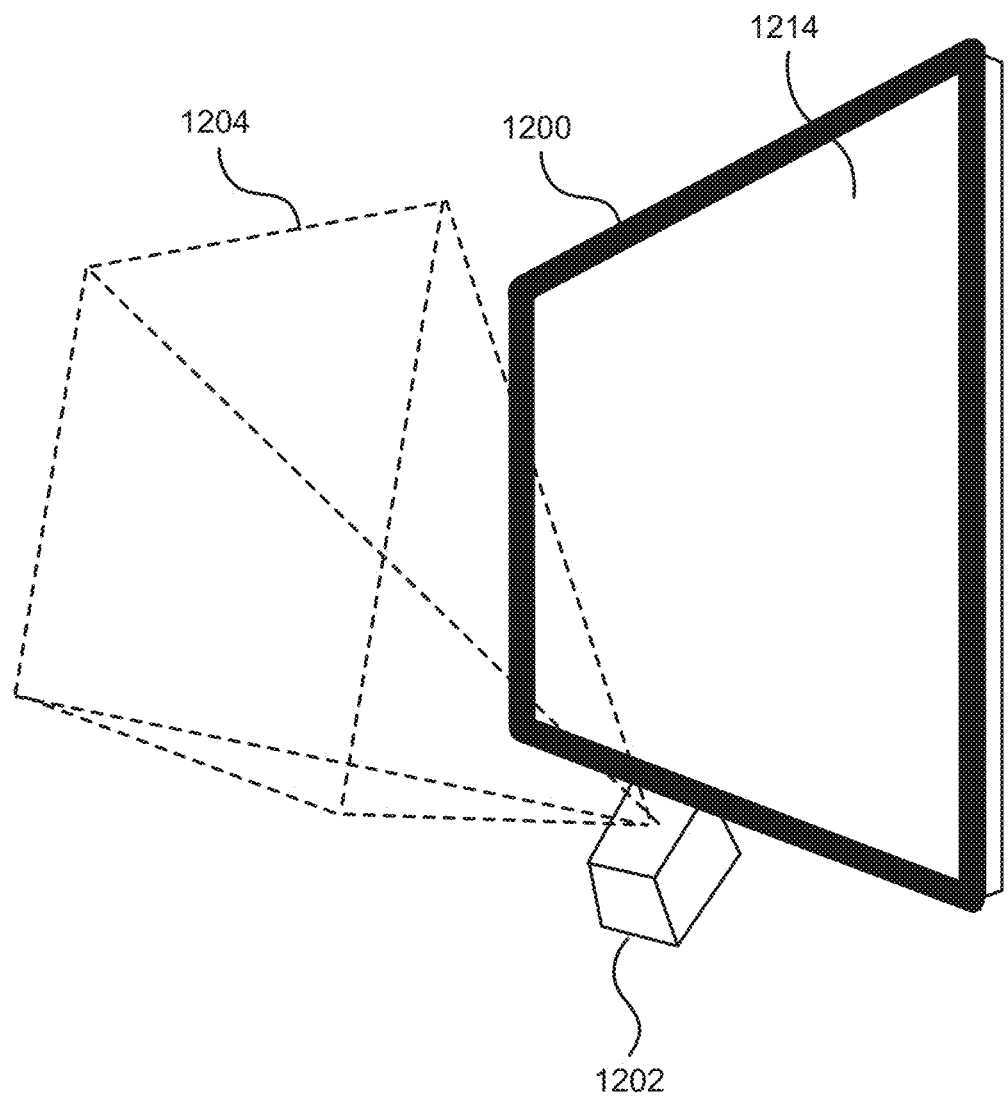
FIG. 12 illustrates an example perspective view of an electronic display including a single time-of-flight sensor, according to at least one example.

Time-of-flight sensors may be mounted in other orientations to produce fields of view near the display screen 1114. For example, the time-of-flight sensors 1102*a-b* can be mounted near the top of the display screen 1114 in a "bottom down" configuration, with fields of view 1104*a-b* that extend downwards to intersect with the two-dimensional plane of the display screen 1114. The triangular shape of the fields of view 1104*a-b* illustrated in FIG. 11 can be produced by time-of-flight sensors 1102*a-b* that are one-dimensional. In other examples, other time-of-flight sensors may produce fields of view with different shapes. For example, FIG. 12 illustrates an example perspective view of an electronic display 1000 including a single time-of-flight sensor 1202, according to one example. The time-of-flight sensor 1202 can be positioned in a "front-facing" configuration. That is, the time-of-flight sensor 1202 can be positioned proximate a bottom edge of a display screen 1214 for the electronic display 1200, and can be angled away from the display screen 1214. The angle and position of the time-of-flight sensor 1202, which can be a three-dimensional sensor, can result in a conical field of view 1204 in front of the display screen 1214.

In some examples, the time-of-flight sensor 1202 can detect not only objects but also gestures of objects, such as a wave of an arm, proximate the display screen 1214 in the conical field of view 1204. The conical field of view 1204 can allow the time-of-flight sensor 1202 to act as a motion detector. In some examples, the time-of-flight sensor 1202 may detect objects or gestures of objects at larger distances from the display screen 1214 than the two time-of-flight sensors 1102*a-b* illustrated in FIG. 11. But in some examples, the spatial resolution of the single time-of-flight sensor 1202 may be lower than that of the two time-of-flight sensors 1102*a-b* illustrated in FIG. 11. In other examples, the spatial resolution of the single time-of-flight sensor 1202 may be higher than the two time-of-flight sensors 1102*a-b* illustrated in FIG. 11 if the time-of-flight sensor 1202 includes more pixels than the two time-of-flight sensors 1102*a-b*.

Referring back to FIG. 9, the size of the bezel 1022, properties of the cover glass 912, and positioning of the time-of-flight sensors 902*a-b* determine the field of view 904 of the time-of-flight sensors 902*a-b*. To determine an optimal location and angle of the time-of-flight sensor 902*a* for detecting objects 916, the following equations can be used:

$$h_{fin} = Hdev * \tan\theta = 3.03 * \tan\theta \tag{1}$$

$$d_{ab} = \frac{h_{dev}}{2}\sin\theta \tag{2}$$

$$d_{fin} = dd + \frac{h_{dev}}{2}\cos\theta \tag{3}$$

$$d_{int} = dd\tan\left(\frac{\pi}{2} - (\theta + \alpha_{dev})\right) \tag{4}$$

Using equations (2) and (3):

$$d_{int} = \left(d_{fin} - \frac{h_{de}}{2}\cos\theta\right)\tan\left(\frac{\pi}{2} - (\theta + \alpha_{dev})\right) \tag{5}$$

Minimizing $d_{ab}$–$d_{int}$ to determine an optimal $\theta$:

$$\text{Min}(|d_{int} - d_{ab}|) = \min\left(\left|\left(d_{fin} - \frac{h_{dev}\cos\theta}{2}\right)\tan\left(\frac{\pi}{2} - (\theta + \alpha_{dev})\right) - \frac{h_{dev}}{2}\sin\theta\right|\right) \tag{6}$$

Adding a cover glass 912 over the time-of-flight sensor 902*a*:

$$\text{Min}(|d_{int} - d_{ab}|) = \tag{7}$$
$$\min\left(\left|\left(d_{fin} - \frac{h_{dev}\cos\theta}{2}\right)\tan\left(\frac{\pi}{2} - (\theta + \alpha_{dev})\right) - \frac{h_{dev}}{2}\sin\theta - \text{cover\_w}\right|\right)$$

The time-of-flight sensors 902*a-b* can detect sensor data related to a distance of an object 916 within the field of view 904 and proximate the electronic display 900 as described above. For example, the time-of-flight sensor 902*a* can be a SPAD based sensor with an 8×8 array of pixels that can detect the example sensor data illustrated in FIG. 13.

Figure 13:
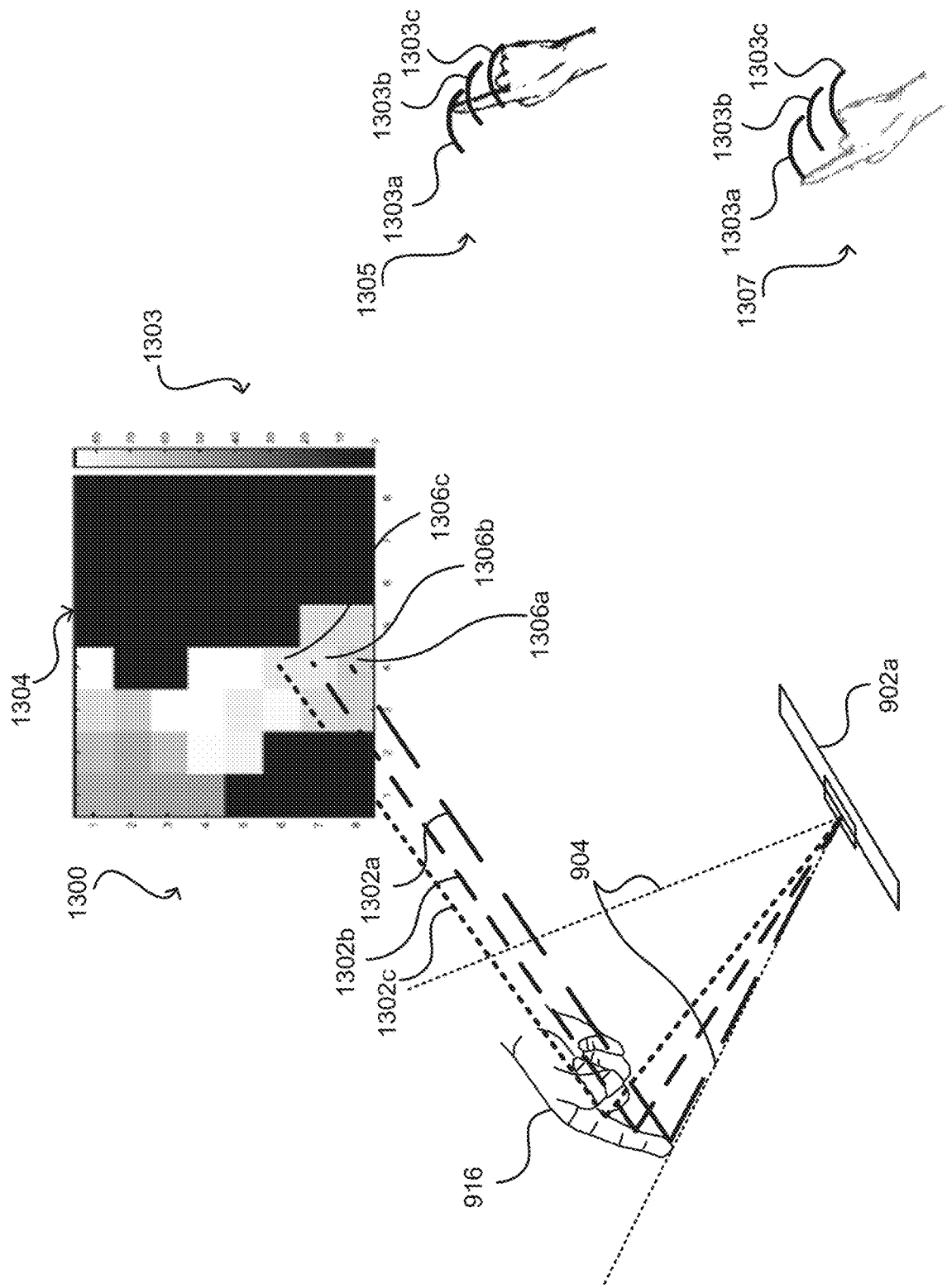
FIG. 13 illustrates example sensor data detected by an 8×8 pixel array time-of-flight sensor, according to at least one example.

FIG. 13 illustrates example sensor data 1300 detected by an 8×8 pixel array time-of-flight sensor, according to at least one example. The sensor data 1300 corresponds to the object 916 illustrated in FIG. 9, such as a hand. Each pixel 1306 in the sensor data 1300 can represent a distance to the object 916 based on a color of the pixel 1306. For example, pixels 1306 that are relatively lighter in color can represent a detection of the object 916. The color bar 1303 represents distance in mm. Pixels 1306 with value 0, such as in region 1304, can represent no detection. The computing device 108 can use the pixels 1306 determine a position of the object 916 on the electronic display 900. For example, sensor data for pixels 1306a-c can each be associated with a distance 1302a-c from a portion of the object 916. The distances 1302a-c can be detected within a field of view 904 for the time-of-flight sensor 902a. The relationships between the pixels 1306a-c (e.g., positioning relative to one another) and the distances 1302a-c measured by the pixels 1306a-c can be used by the computing device 108 to define a terminal point of selection based on the orientation of the object 916. For example, the computing device 108 can determine a position estimate 1305 based on arcs 1303a-c. In particular, this may include determining that the arc 1303a is indicative of a distance 1302a detected by pixel 1306a was reflected by the tip of an extended pointer finger of a hand, the arc 1303b is indicative of a distance 1302b detected by pixel 1306b was reflected by the side of the extended finger, and the arc 1303c is indicative of a distance 1302c detected by pixel 1306c was reflected by knuckles of the hand. Thus, the terminal point of selection can be based on the distance 1302a detected by pixel 1306a, representing the tip of the extended pointer finger.

Additionally, the resolution of the example sensor data 1300 may be enhanced using a prediction based on information about the distances 1302a-c and the fact that the object 916 (e.g., a hand) is a rigid body. For example, if only pixel 1306a were used, the resolution of the sensor data may be limited to the distance 1302a corresponding to the arc 1303a. However, because arcs 1303b and 1303c are also known, the resolution of the sensor data can be increased to include the areas that include the arcs 1303a-c. This excludes orientations of the finger that are outside of the arcs 1303a-c, e.g., as shown in position 1307. For example, the position 1307 may be determined to be unlikely considering the arcs 1303 and the distances 1302, while the position 1305 may be considered probable considering the arcs 1303 and the distances 1302.

Additionally, the sensor data 1300 can include a detected gesture performed by the object 916 that may be proximate the electronic display 900. For example, the gesture can include the object 916 approaching the electronic display 900 to "click" on a graphical element displayed on the electronic display 900 by performing a tapping motion. When the gesture is performed proximate the electronic display 900, the sensor data representing the gesture can be used in connection with the sensor data representing the position of the object 916 to register a user selection on the electronic display 900. For example, the computing device 108 can determine that a tapping motion of an object 916 which is an open hand can be associated with a different user selection than a tapping motion of an object 916 which is a closed hand with a pointer finger extended. In other examples, the gesture can include a motion of the object 916 that is not proximate the electronic display 900 (e.g., not within a two-dimensional plane parallel to a planar surface of the electronic display 900 and defined at or near the planar surface). For example, the sensor data can include a detection of a gesture within a three-dimensional space in front of the electronic display 900. Examples of such a gesture can include a "swiping" motion of the hand from right to left. In some examples, the computing device 108 can use machine learning to determine the position of the object 916 or the motion of the gesture.

FIG. 14 illustrates an example flowchart showing a process 1400 for implementing techniques relating to registering a user selection of a graphical element displayed on an electronic display using time-of-flight sensors, according to at least one example. The computing device 108 depicted in FIG. 1 may perform the process 1400.

The process 1400 may begin at block 1402 by the computing device 108 receiving first sensor data 106a output by a first time-of-flight sensor 104a. The time-of-flight sensor 104a can be a single photon avalanche diode (SPAD) based sensor. In some examples, the SPAD based sensor can include an N×M array of pixels, where N and M are both greater than 1. The first time-of-flight sensor 104a can be positioned in a first orientation with respect to an electronic display 101. The electronic display 101 can be represented by a two-dimensional plane. The first time-of-flight sensor 104a can be characterized by a first field of view that intersects the two-dimensional plane. In some examples, the first time-of-flight sensor 104a can include a first detector array having a first plurality of pixels that defines a first plurality of detection zones. The first sensor data 106a can be associated with a first distance from the first time-of-flight sensor 104a and a first identification of a first detection zone of the first plurality of detection zones.

In some examples, the computing device 108 can additionally receive second sensor data 106b output by a second time-of-flight sensor 104b. The second time-of-flight sensor 104b may be positioned in a second orientation with respect to the electronic display 101. The second time-of-flight sensor 104b can include a second detector array having a second plurality of pixels that define a second plurality of detection zones. The second sensor data 106b can be associated with a second distance from the second time-of-flight sensor 104b and a second identification of a second detection zone of the second plurality of detection zones. In one particular example, the first time-of-flight sensor 104a can include an array of multiple pixels and the second time-of-flight sensor 104b can include only one pixel. In other examples, the first time of flight sensor 104a and the second time-of-flight sensor 104b can each include two or more pixels. In some examples, the electronic display 101 can include a bezel, and the first time-of-flight sensor 104a and the second time-of-flight sensor 104b can be mounted to the bezel.

In some examples, the first sensor data 106a output by the first time-of-flight sensor 104a can include a plurality of signals representing detected light from a plurality of surface emitting lasers mounted adjacent to the first time-of-flight sensor 104a. Each of the plurality of signals can be received at a different time. In other examples, the first sensor data 106a output by the first time-of-flight sensor 104a can be representative of (i) a first signal representing first light generated by a light source and detected at a first time, and (ii) a second signal representing second light generated by the light source and detected at a second time. The light source may be a surface emitting laser. The second light may be output from a light transport media after being generated by the surface emitting laser.

The process 1400 may continue at block 1404 by the computing device 108 determining a position of an object 116 on a display surface 114 of the electronic display 101 based at least in part on the first sensor data 106a. The computing device 108 may also determine the position of the object 116 based on the second sensor data 106b. In some examples, the computing device 108 may determine the position of the object 116 by mapping the object 116 to a set of coordinates on the two-dimensional plane using the first distance and the first identification of the first detection zone. Additionally, the computing device 108 may determine the position of the object 116 by mapping using the second distance and the second identification of the second detection zone to the set of coordinates.

The process 1400 may continue at block 1406 by the computing device 108 registering a user selection of a graphical element 120 displayed on the electronic display 101 at the determined position. For example, the computing device 108 can map the set of coordinates to the graphical element 120. The computing device 108 can then perform an operation related to the selection of the graphical element 120. In some examples, the computing device 108 can further perform additional operations that include detecting a gesture associated with the object 116 based at least in part on the first sensor data 106a. For example, determining the position in block 1404 can include determining the position using information about the gesture.

Figure 15:
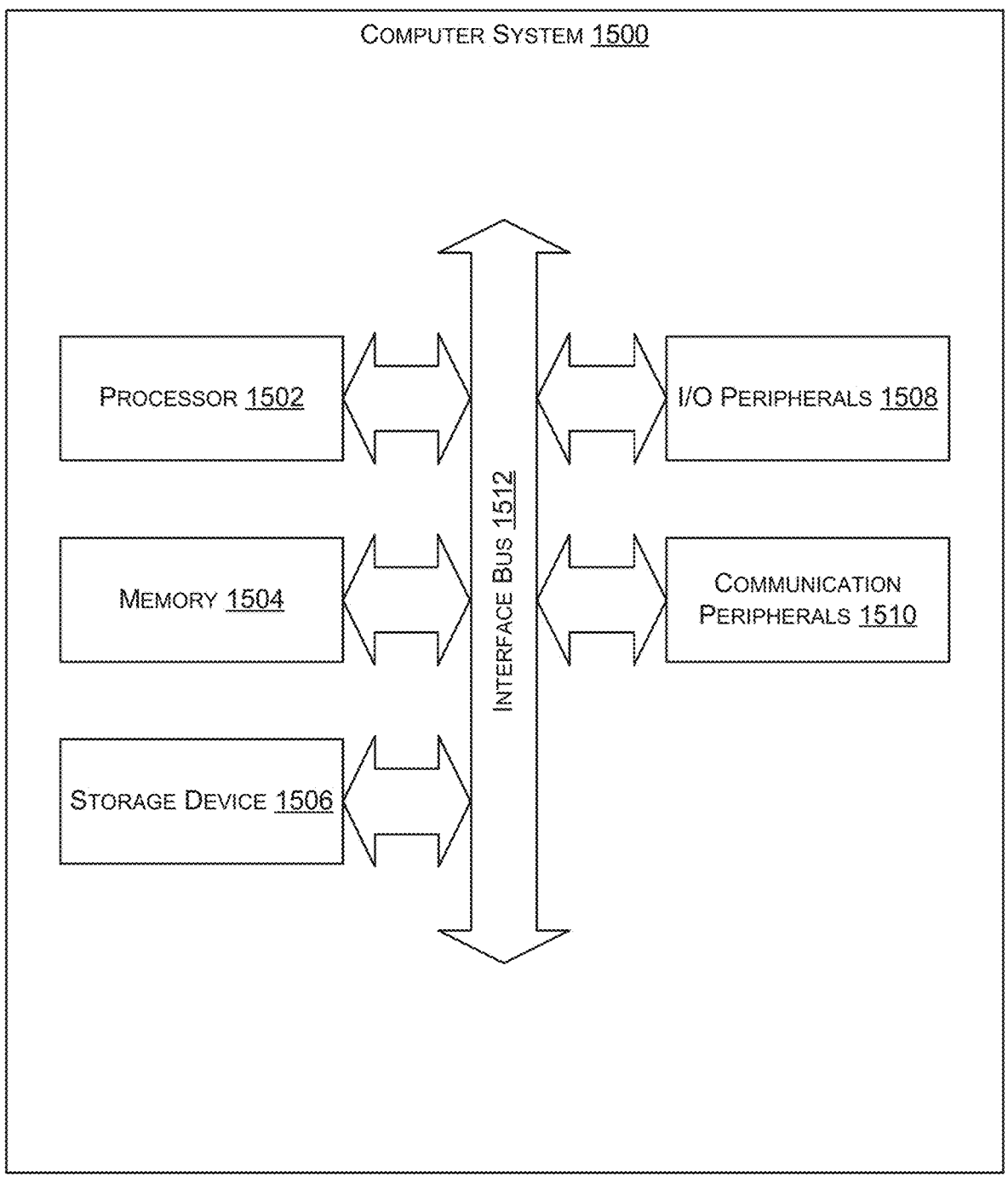
FIG. 15 illustrates an environment in which various embodiments can be implemented.

FIG. 15 illustrates example components of a computer system 1500, in accordance with embodiments of the present disclosure. The computer system 1500 can be used as a node in a computer network, where this node provides one or more computing components of an underlay network of the computer network and/or one or more computing components of an overlay network of the computer network. Additionally or alternatively, the components of the computer system 1500 can be used in an endpoint. Although the components of the computer system 1500 are illustrated as belonging to a same system, the computer system 1500 can also be distributed (e.g., between multiple user devices). The computer system 1500 can be an example of the computing device 108.

The computer system 1500 includes at least a processor 1502, a memory 1504, a storage device 1506, input/output peripherals (I/O) 1508, communication peripherals 1510, and an interface bus 1512. The interface bus 1512 is configured to communicate, transmit, and transfer data, controls, and commands among the various components of the computer system 1500. The memory 1504 and the storage device 1506 include computer-readable storage media, such as RAM, ROM, electrically erasable programmable read-only memory (EEPROM), hard drives, CD-ROMs, optical storage devices, magnetic storage devices, electronic non-volatile computer storage; for example, Flash® memory, and other tangible storage media. Any of such computer-readable storage media can be configured to store instructions or program codes embodying aspects of the disclosure. The memory 1504 and the storage device 1506 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1500.

Further, the memory 1504 includes an operating system, programs, and applications. The processor 1502 is configured to execute the stored instructions and includes, for example, a logical processing unit, a microprocessor, a digital signal processor, and other processors. The memory 1504 and/or the processor 1502 can be virtualized and can be hosted within another computer system of, for example, a cloud network or a data center. The I/O peripherals 1508 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1508 are connected to the processor 1502 through any of the ports coupled to the interface bus 1512. The communication peripherals 1510 are configured to facilitate communication between the computer system 1500 and other systems over a communications network and include, for example, a network interface controller, modem, wireless and wired interface cards, antenna, and other communication peripherals The computer system 1500 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random-access memory ("RAM") or read-only memory ("ROM"), as well as removable media devices, memory cards, and/or flash cards.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:
   an electronic display comprising a display surface that is represented by a two-dimensional plane defined on the display surface of the electronic display;
   a first time-of-flight sensor mounted to the electronic display in a first orientation and configured to sense objects touching the display surface at the two-dimensional plane, the first time-of-flight sensor being characterized by a first field of view that is parallel to the two-dimensional plane;
   a second time-of-flight sensor mounted to the electronic display in a second orientation and configured to sense objects touching the display surface at the two-dimensional plane, the second time-of-flight sensor being characterized by a second field of view that is parallel to the two-dimensional plane;
   a light emitter mounted to the electronic display adjacent to a separate location from the first time-of-flight sensor and the second time-of-flight sensor, the light emitter being configured to emit light that is detectable by at least one of the first time-of-flight sensor or the second time-of-flight sensor;
   a memory storing computer-executable instructions; and
   a processor configured to access the memory and execute the computer-executable instructions to at least:
      receive first sensor data output by the first time-of-flight sensor responsive to detection of the light from the light emitter, the first sensor data representing a first distance between an object touching a surface of the electronic display and the first time-of-flight sensor;
      receive second sensor data output by the second time-of-flight sensor responsive to detection of the light from the light emitter, the second sensor data representing a second distance between the object and the second time-of-flight sensor;
      determine a position of the object touching the surface of the electronic display by triangulating the position of the object using the first distance and the second distance; and
      register a user selection of a graphical element displayed on the electronic display at the determined position.

2. The computer system of claim 1, wherein the first sensor data further represents a first detection zone associated with the first time-of-flight sensor, and the second sensor data further represents a second detection zone associated with the second time-of-flight sensor, and wherein determining the position of the object comprises determining the position of the object using the first detection zone and the second detection zone.

3. The computer system of claim 1, wherein the first time-of-flight sensor and the second time-of-flight sensor each comprise two or more pixels.

4. The computer system of claim 1, wherein determining the position of the object touching the surface of the electronic display comprises determining a set of coordinates of the object on the two-dimensional plane, and wherein registering the user selection comprises mapping the set of coordinates to the graphical element.

5. The computer system of claim 4, wherein the electronic display comprises a bezel, and wherein the first time-of-flight sensor and the second time-of-flight sensor are mounted to the bezel.

6. A computer-implemented method, comprising:
receiving first sensor data output by a first time-of-flight sensor, the first time-of-flight sensor positioned in a first orientation with respect to an electronic display, wherein the first time-of-flight sensor is characterized by a first field of view that is parallel to a two-dimensional plane of a surface of the electronic display to sense objects touching the surface at the two-dimensional plane, wherein the two-dimensional plane is defined on the surface of the electronic display, wherein the first sensor data represents a first distance between the first time-of-flight sensor and an object touching the surface of the electronic display, wherein the first sensor data is generated by the first time-of-flight sensor in response to detecting light emitted by a light emitter that is mounted on the electronic display at a separate location from the first time-of-flight sensor and the second time-of-flight sensor;
receiving second sensor data output by the second time-of-flight sensor positioned in a second orientation with respect to the electronic display, wherein the second time-of-flight sensor is characterized by a second field of view that is parallel to the two-dimensional plane to sense objects touching the surface at the two-dimensional plane, wherein the second sensor data represents a second distance between the second time-of-flight sensor and the object, wherein the second sensor data is generated by the second time-of-flight sensor in response to detecting light emitted by the light emitter;
determining a position of the object touching the surface of the electronic display based at least in part by triangulating the position of the object using the first distance and the second distance; and
registering a user selection of a graphical element displayed on the electronic display at the determined position.

7. The computer-implemented method of claim 6, wherein the first time-of-flight sensor comprises a first detector array having a plurality of pixels that defines a first plurality of detection zones, and wherein the first sensor data is associated with a first identification of a first detection zone of the first plurality of detection zones.

8. The computer-implemented method of claim 7, wherein the surface of the electronic display is represented by the two-dimensional plane, and wherein determining the position of the object comprises mapping using the first distance and the first identification of the first detection zone the object to a set of coordinates on the two-dimensional plane.

9. The computer-implemented method of claim 6, wherein the first time-of-flight sensor comprises a first detector array having a first plurality of pixels that define a first plurality of detection zones, and wherein the first sensor data is associated with a first identification of a first detection zone of the first plurality of detection zones, and wherein the second time-of-flight sensor comprises a second detector array having a second plurality of pixels that define a second plurality of detection zones, and wherein the second sensor data is associated with a second identification of a second detection zone of the second plurality of detection zones.

10. The computer-implemented method of claim 9, wherein the surface of the electronic display is represented by the two-dimensional plane, and wherein determining the position of the object comprises mapping using (i) the first distance, (ii) the first identification of the first detection zone, (iii) the second distance, and (iv) the second identification of the second detection zone to a set of coordinates on the two-dimensional plane.

11. The computer-implemented method of claim 6, wherein the first sensor data output by the first time-of-flight sensor comprises a plurality of signals representing detected light from a plurality of surface emitting lasers, wherein each of the plurality of signals is received at a distinct time.

12. The computer-implemented method of claim 6, wherein the first sensor data output by the first time-of-flight sensor is representative of (i) a first signal representing first light generated by the light emitter and detected at a first time, and (ii) a second signal representing second light generated by the light emitter and detected at a second time.

13. The computer-implemented method of claim 12, wherein the light emitter comprises a surface emitting laser, and wherein the second light is output from a light transport media after being generated by the surface emitting laser.

14. One or more non-transitory computer-readable media comprising computer-executable instructions that, when executed by one or more processors of a computing device, cause the computing device to perform operations comprising:
receiving first sensor data output by a first time-of-flight sensor positioned in a first orientation with respect to an electronic display and second sensor data output by a second time-of-flight sensor positioned in a second orientation with respect to the electronic display, each of the first time-of-flight sensor and the second time-of-flight sensor being positioned with a field of view that is parallel to a two-dimensional plane defined on a surface of the electronic display, wherein the first sensor data represents a first distance between the first time-of-flight sensor and an object touching the surface of the electronic display, and wherein the second sensor data represents a second distance between the second time-of-flight sensor and the object, wherein the first sensor data is generated by the first time-of-flight sensor in response to detecting light emitted by a light emitter that is positioned in a third orientation with respect to the electronic display that is distinct from the first orientation and the second orientation, wherein the second sensor data is generated by the second time-of-flight sensor in response to detecting light emitted by the light emitter;
determining a position of the object touching the surface of the electronic display based at least in part by triangulating the position of the object using the first distance and the second distance; and
registering a user selection of a graphical element displayed on the electronic display at the determined position.

15. The one or more non-transitory computer-readable media of claim 14, wherein the first time-of-flight sensor or the second time-of-flight sensor comprises a single photon avalanche diode (SPAD) based sensor.

16. The one or more non-transitory computer-readable media of claim 15, wherein the SPAD based sensor comprises an N×M array of pixels, wherein N and M are both greater than 1.

17. The one or more non-transitory computer-readable media of claim 16, wherein the one or more non-transitory computer-readable media comprise additional computer-executable instructions that, when executed by the one or more processors of the computing device, cause the computing device to perform additional operations comprising detecting a gesture associated with the object based at least in part on the first sensor data or the second sensor data, and wherein determining the position comprises determining the position using information about the gesture.

18. The computer-implemented method of claim 6, wherein the electronic display comprises a bezel, and wherein the first time-of-flight sensor and the second time-of-flight sensor are mounted within the bezel beneath a cover glass positioned over the surface of the electronic display.

19. The computer-implemented method of claim 6, wherein the first sensor data indicates a first arc of potential positions at which the object may be located at the first distance from the first time-of-flight sensor, wherein the second sensor data indicates a second arc of potential positions at which the object may be located at the second distance from the second time-of-flight sensor, and wherein triangulating the position of the object using the first sensor data and the second sensor data further comprises:
   identifying a coordinate on the surface of the electronic display at which the first arc intersects the second arc.

\* \* \* \* \*